US012697825B2

(12) United States Patent
Fukui et al.

(10) Patent No.: US 12,697,825 B2
(45) Date of Patent: Aug. 4, 2026

(54) PLATEN MOUNTABLE ON A PRINTER

(71) Applicant: BROTHER KOGYO KABUSHIKI KAISHA, Nagoya (JP)

(72) Inventors: Yugo Fukui, Kariya (JP); Goro Okada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 238 days.

(21) Appl. No.: 18/590,594

(22) Filed: Feb. 28, 2024

(65) Prior Publication Data

US 2024/0198700 A1 Jun. 20, 2024

Related U.S. Application Data

(63) Continuation of application No. PCT/JP2022/031354, filed on Aug. 19, 2022.

(30) Foreign Application Priority Data

Aug. 30, 2021 (JP) ................................ 2021-139590

(51) Int. Cl.
*B41J 11/14* (2006.01)
*B41J 2/01* (2006.01)
(Continued)

(52) U.S. Cl.
CPC ................. *B41J 11/14* (2013.01); *B41J 2/01* (2013.01); *B41J 3/4078* (2013.01); *B41J 11/0015* (2013.01); *B41J 11/06* (2013.01)

(58) Field of Classification Search
CPC ......... B41J 11/14; B41J 11/0015; B41J 11/06; B41J 2/01; B41J 3/4078
See application file for complete search history.

(56) References Cited

U.S. PATENT DOCUMENTS 7,765,927 B1 8/2010 Liu et al.
9,056,512 B1 * 6/2015 Kanzaki .............. B41J 2/17596
(Continued)

FOREIGN PATENT DOCUMENTS

JP 2006124842 A 5/2006
JP 2015131457 A 7/2015
(Continued)

OTHER PUBLICATIONS

International Search Report of corresponding PCT application PCT/JP2022/031354, dated Sep. 20, 2022.
(Continued)

*Primary Examiner* — Henok D Legesse
(74) *Attorney, Agent, or Firm* — HOGAN LOVELLS US LLP

(57) ABSTRACT

A platen is configured to define a contact surface which is a medium placement surface when being mounted on a printer. The platen includes: first and second members having first and second surfaces, respectively. The first member includes a plate having the first surface. A state of the platen is switchable between: a first state in which the contact surface is formed inside an outer edge of the plate by the first and second surfaces to have a first area; and a second state in which the contact surface is formed by the first surface to have a second area smaller than the first area. In the second state, the first surface forms the contact surface inside the outer edge and the second surface does not form the contact surface.

10 Claims, 7 Drawing Sheets

(51) Int. Cl.

| | |
|---|---|
| ***B41J 3/407*** | (2006.01) |
| ***B41J 11/00*** | (2006.01) |
| ***B41J 11/06*** | (2006.01) |

(56) References Cited

U.S. PATENT DOCUMENTS

| | | | | |
|---|---|---|---|---|
| 2018/0117930 | A1* | 5/2018 | Hamada | B41J 11/20 |
| 2018/0244080 | A1 | 8/2018 | Hamada | |
| 2020/0156389 | A1 | 5/2020 | Kojima et al. | |
| 2024/0316957 | A1* | 9/2024 | Mordechai | B41J 11/06 |

FOREIGN PATENT DOCUMENTS

| | | | |
|---|---|---|---|
| JP | 2016093972 | A | 5/2016 |
| JP | 2018138362 | A | 9/2018 |
| JP | 3220536 | U | 3/2019 |
| JP | 2020082731 | A | 6/2020 |
| JP | 2020175509 | A | 10/2020 |

OTHER PUBLICATIONS

Office Action issued in corresponding Japanese patent application No. 2021-139590, dated Dec. 10, 2024. (4 pages.).

International Preliminary Report on Patentability with Written Opinion for corresponding PCT application PCT/JP2022/031354, dated Mar. 5, 2024. (5 pages.).

* cited by examiner

PLATEN MOUNTABLE ON A PRINTER

REFERENCE TO RELATED APPLICATIONS

This is a continuation of International Application No. PCT/JP2022/031354 filed on Aug. 19, 2022, and claims priority from Japanese Patent Application No. 2021-139590 filed on Aug. 30, 2021, the entire content of which is incorporated herein by reference.

BACKGROUND ART

The present disclosure relates to a platen and a printer.

A printing apparatus described in JP2018-138362A includes: a medium support unit for supporting a medium such as cloth from below; and a print head for performing printing by ejecting ink onto the medium.

DESCRIPTION

In the above-described printing apparatus, a medium wetted with a liquid such as ink may adhere the medium support unit due to the liquid, and may be difficult to remove.

An object of the present disclosure is to provide a platen and a printer capable of preventing the difficulty in removing a wet medium.

A platen according to a first aspect of the present disclosure is a platen configured to be mounted on a printer configured to eject ink onto a medium, the platen being configured to define a contact surface which is a medium placement surface when the platen is mounted on the printer, the platen including: a first member having a first surface; and a second member having a second surface, in which: the first member includes a plate having the first surface; a state of the platen is switchable between a first state in which the contact surface is formed by the first surface and the second surface such that a size of the contact surface is a first area, and a second state in which the contact surface is formed by the first surface such that a size of the contact surface is a second area smaller than the first area; in the first state, the first surface and the second surface form the contact surface inside an outer edge of the plate in a direction in which the first surface extends; and in the second state, the first surface forms the contact surface inside the outer edge of the plate and the second surface does not form the contact surface.

The state of the platen of the first aspect is switchable from the first state to the second state such that the size of the contact surface decreases from the first area to the second area. By switching the state from the first state to the second state, it is possible to prevent the difficulty in removing a wet medium from the platen.

The platen may further include: a switching portion configured to switch the state of the platen between the first state and the second state by moving the second member relative to the first member.

In this case, the user switches the platen between the first state and the second state via the switching portion. Thus, the platen can switch the state by the switching portion.

In a central portion of the plate, the size of the contact surface in the second state may be smaller than the size of the contact surface.

Within the medium placed on the contact surface, the ink is easily ejected onto a portion placed on the central portion of the plate. In the central portion of the plate, the size of the contact surface in the second state is smaller than the size of the contact surface in the first state. Accordingly, the platen in the second state can prevent the difficulty in removing the medium placed on the central portion of the plate.

The second area may be half or less of the first area.

In this case, since the second area is half or less of the first area, the size of the contact surface of the platen in the second state is smaller than the size of the contact surface of the platen in the first state. As a result, the platen in the second state can prevent the difficulty in removing the wet medium as compared with the platen in the first state.

The second surface may include a plurality of partial surfaces, and the plurality of partial surfaces may be arranged on the second member at intervals in directions corresponding to a main scanning direction and a sub-scanning direction of the printer when the platen is mounted on the printer.

In this case, since the plurality of partial surfaces are arranged at intervals in the main scanning direction and the sub-scanning direction, the platen can stably support the placed medium even in the second state in which the size of the contact surface is smaller than that in the first state.

The plurality of partial surfaces may include at least one of a first partial surface having a circular shape or a second partial surface having a quadrangular shape.

Since each of the plurality of partial surfaces is circular or shape and a second partial surface having a quadrangular shape, the second member can be easily formed as compared with a case where each of the plurality of partial surfaces is elliptical or polygonal other than quadrangular.

The platen may further include: a locking mechanism configured to lock the state of the platen to one of the first state or the second state.

In this case, the locking mechanism locks the state of the platen to one of the first state or the second state, so that the platen can prevent the state from being switched from one to the other.

The contact surface in the first state may have a smooth surface by the first surface and the second surface.

In this case, the platen can stably support the medium in the first state.

A printer according to a second aspect of the present disclosure includes: the platen according to the first aspect; and an ink ejection unit configured to eject the ink onto the medium placed on the contact surface of the platen in the first state.

The printer of the second aspect can achieve the same or similar effects as those of the first aspect.

The ink ejection unit may eject the ink in a state where the medium is wetted with a pretreatment agent.

In this case, the medium after the ink is ejected is placed on the contact surface of the platen in a state where the medium is wetted with the pretreatment agent and the ink. By switching the state from the first state to the second state, it is possible to prevent the difficulty in removing the wet medium from the platen.

Figure 5:
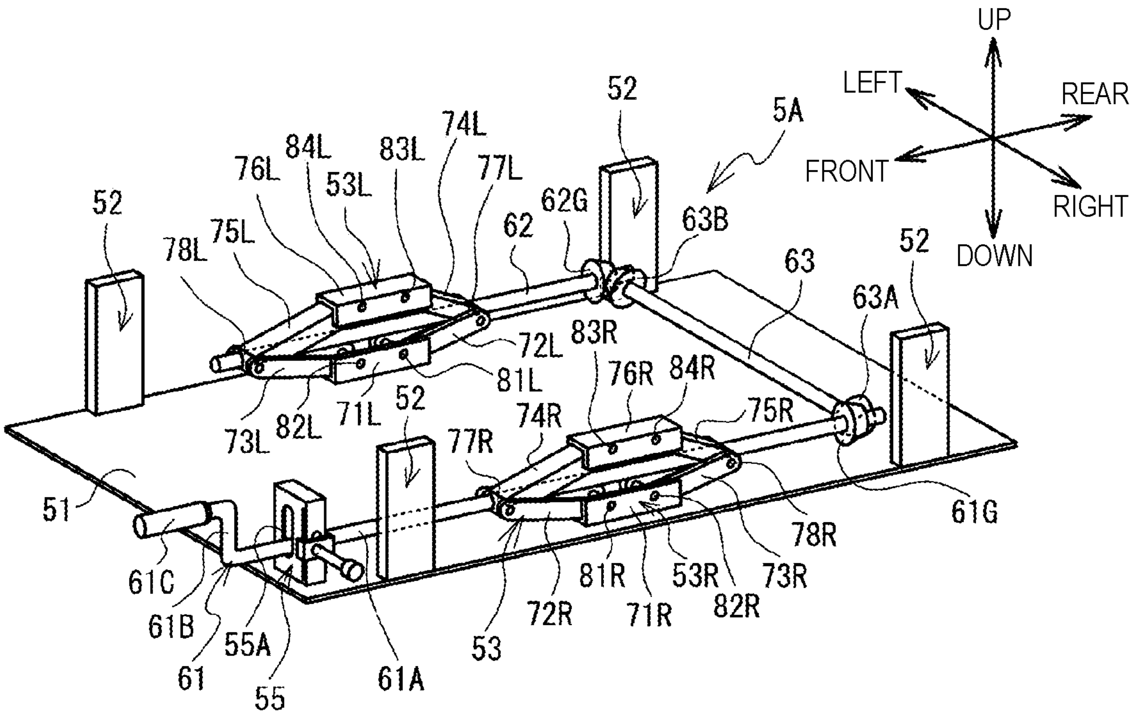

FIG. 5 is a diagram in which the platen 5A in the second state is removed of the first member 57, the second member 58, and the coupling boxes 64, 65.

Figure 6A:
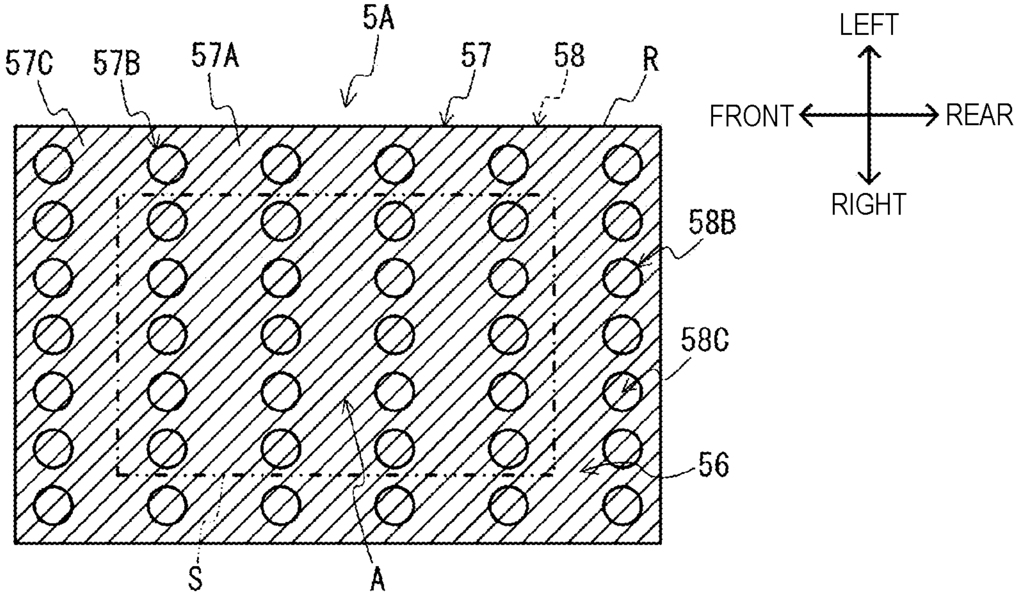
Figure 6B:
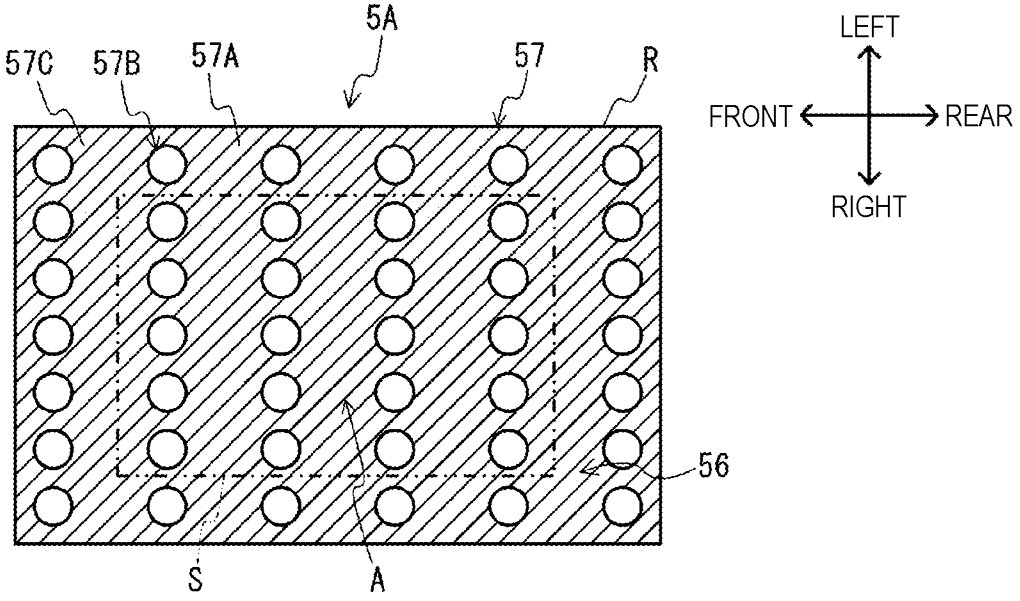

FIG. 6A and FIG. 6B are a plan view of the contact surface 56 in the first state and a plan view of the contact surface 56 in the second state, respectively, in the platen 5A.

Figure 7:
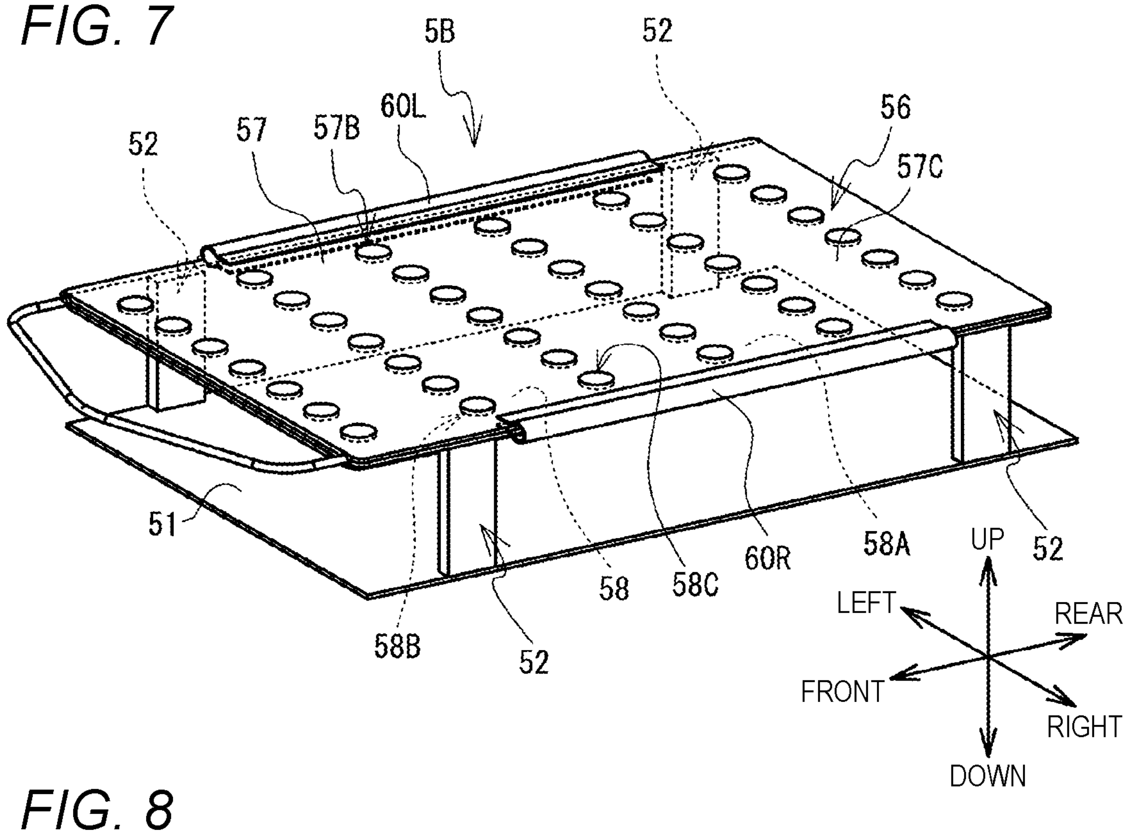

FIG. 7 is a perspective view of the platen 5B in the first state as viewed from the upper front right side in a modification.

Figure 8:
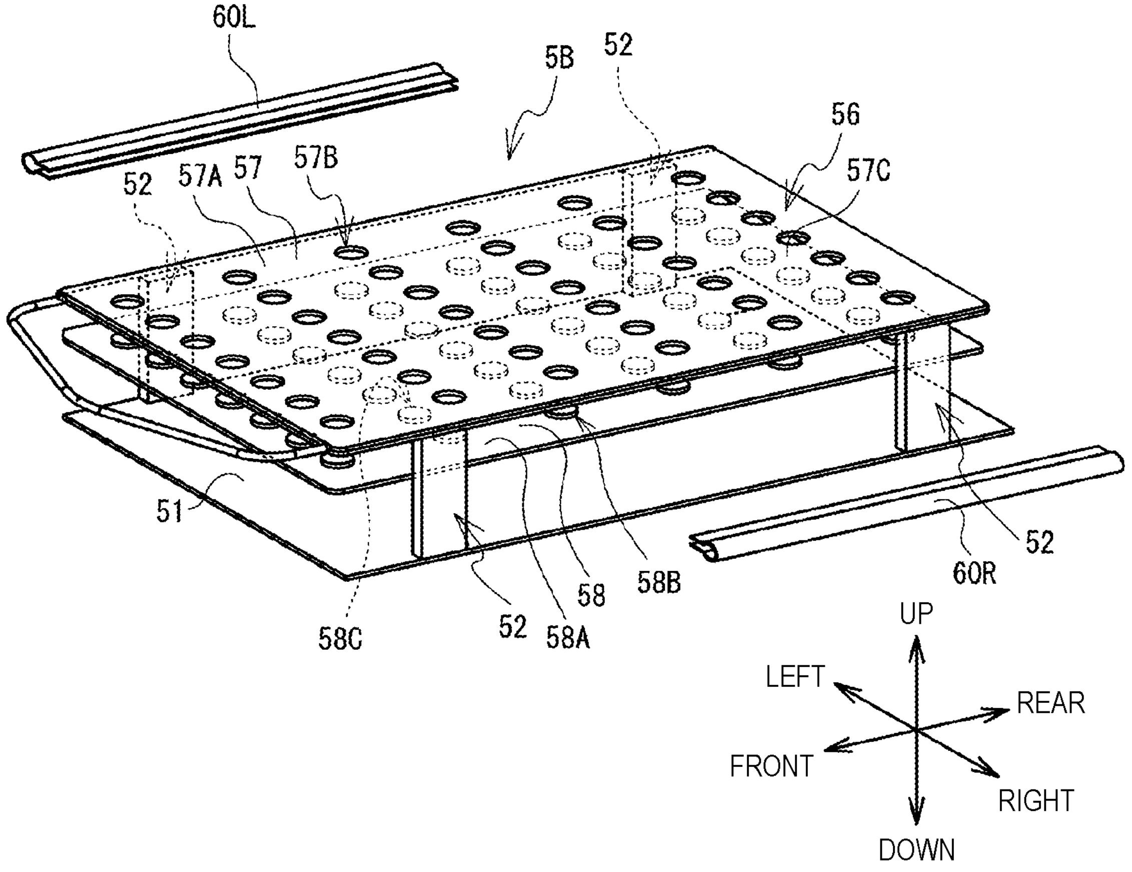

FIG. 8 is a perspective view of the platen 5B in the second state as viewed from the upper front right side in a modification.

Figure 1:
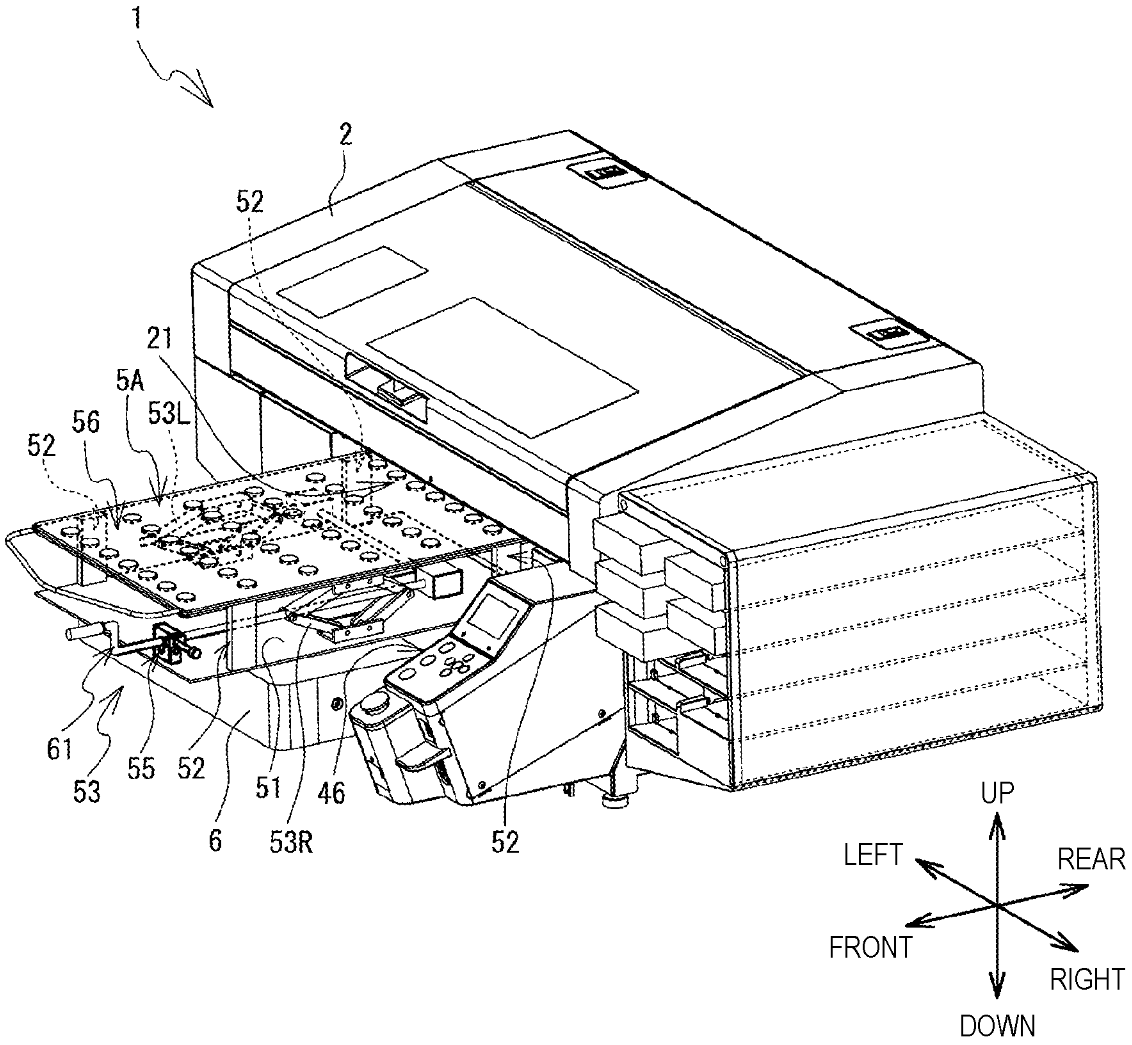
FIG. 1 is a perspective view of a printer 1 as viewed from the upper front right side.

A printer 1 and a platen 5A according to an embodiment of the present disclosure will be described with reference to the drawings. The printer 1 illustrated in FIG. 1 is an ink jet printer, and performs printing by ejecting ink onto a medium. The medium is, for example, cloth, paper, or the like, and is a T-shirt in the present embodiment. The upper, lower, lower left, upper right, lower right, and upper left sides in FIG. 1 respectively correspond to the upper, lower, front, rear, right, and left sides of the printer 1 and the platen 5A. In the present embodiment, mechanical elements in the drawings indicate actual scales.

The schematic configuration of the printer 1 will be described with reference to FIGS. 1 and 2. As illustrated in FIG. 1, the printer 1 includes a casing 2, a conveying unit 6, and a platen 5A. The casing 2 has a quadrangular parallelepiped shape. The casing 2 is formed with an opening 21. The opening 21 extends from the front surface to the rear surface of the casing 2. On the front surface of the casing 2, the right side of the opening 21 is provided with an input unit 46. The user inputs various information to the printer 1 by operating the input unit 46.

The conveying unit 6 is provided below the opening 21 and conveys the platen 5A in the front-rear direction. The conveying unit 6 includes a pair of rails 12 illustrated in FIG. 2. The pair of rails 12 are parallel in the left-right direction and extend in the front-rear direction. The platen 5A is located above the conveying unit 6 and is supported by the pair of rails 12.

The lower portion of the platen 5A is provided with a sub-scanning motor (not illustrated). The platen 5A can move in the front-rear direction along the pair of rails 12 by driving the sub-scanning motor. That is, the front-rear direction of the printer 1 is the sub-scanning direction. Details of the structure of the platen 5A will be described later.

Figure 2:
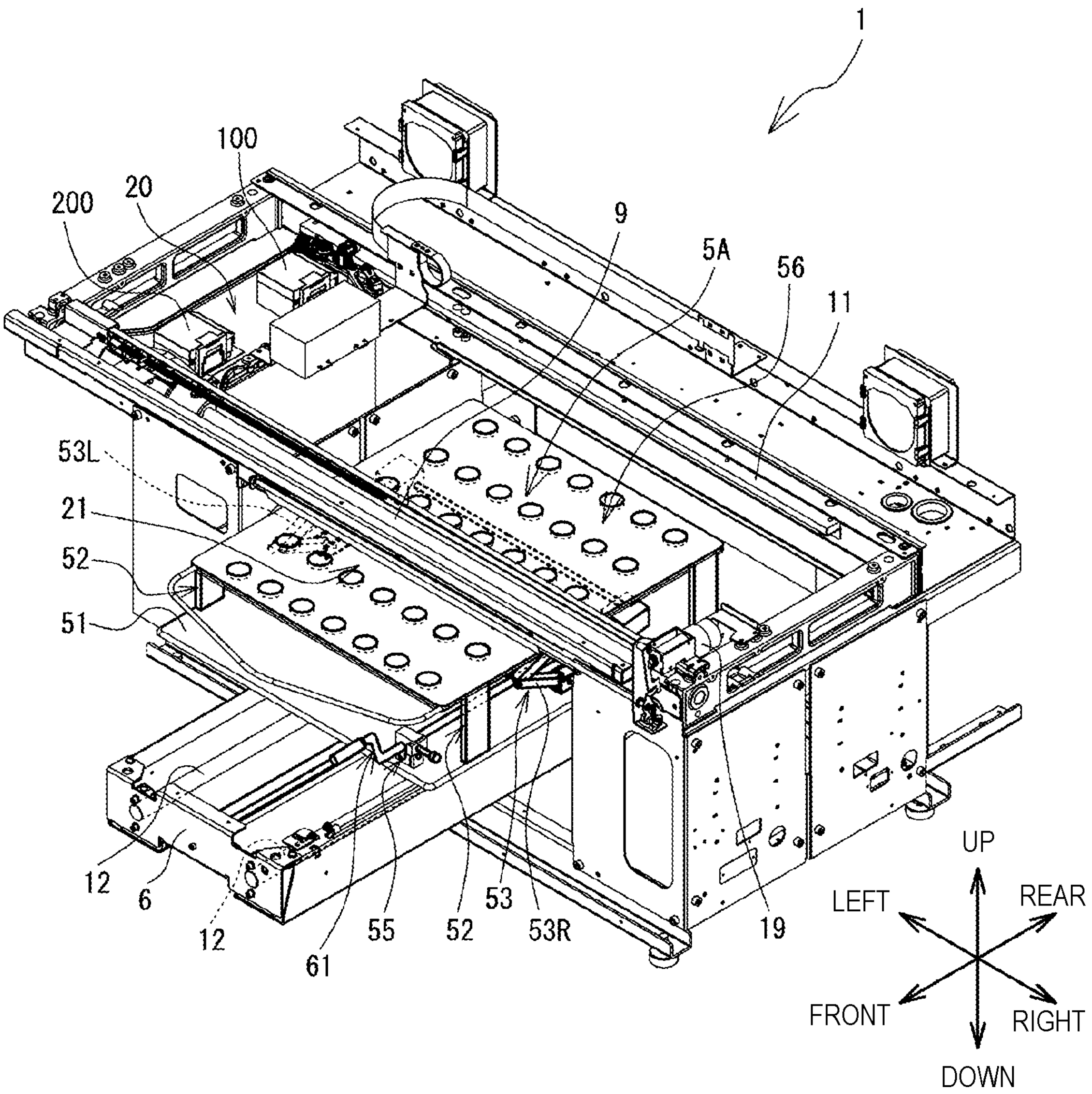
FIG. 2 is a perspective view of the printer 1 removed of the upper portion of the casing 2, as viewed from the upper front right side.

As illustrated in FIG. 2, the printer 1 includes rails 11, a guide shaft 9, a carriage 20, and heads 100, 200 in the casing 2 illustrated in FIG. 1. The rails 11 are provided at the upper rear of the printer 1 and extend in the left-right direction. The guide shaft 9 is provided in front of the rails 11 and extends in the left-right direction. The carriage 20 is positioned between the rails 11 and the guide shaft 9 in the front-rear direction, and is supported by the rails 11 and the guide shaft 9. The right end of the guide shaft 9 is provided with a main scanning motor 19 on the right side. The carriage 20 can move in the left-right direction along the rails 11 and the guide shaft 9 by driving of the main scanning motor 19.

The heads 100, 200 are mounted on the carriage 20 in parallel in the front-rear direction, and move in the left-right direction together with the carriage 20. That is, the left-right direction of the printer 1 is the main scanning direction. Each of the heads 100, 200 includes a nozzle (not illustrated) at the lower portion thereof, and ejects ink downward from the nozzle.

The printer 1 can print a color image on a medium using inks of five colors including white, black, yellow, cyan, and magenta. Hereinafter, the white ink among the inks of five colors is referred to as white ink, and the inks of the four colors including black, cyan, yellow, and magenta are collectively referred to as color ink. The white ink and the color ink are simply referred to as ink when collectively referred to, or when not specifying one among them. The white ink is used for printing as a portion representing white of an image or as the base of ink of another color. The color ink is ejected onto the base formed with the white ink and used for printing a color image.

The head 100 ejects white ink from the nozzle. The head 200 ejects color ink from the nozzle.

Figure 3:
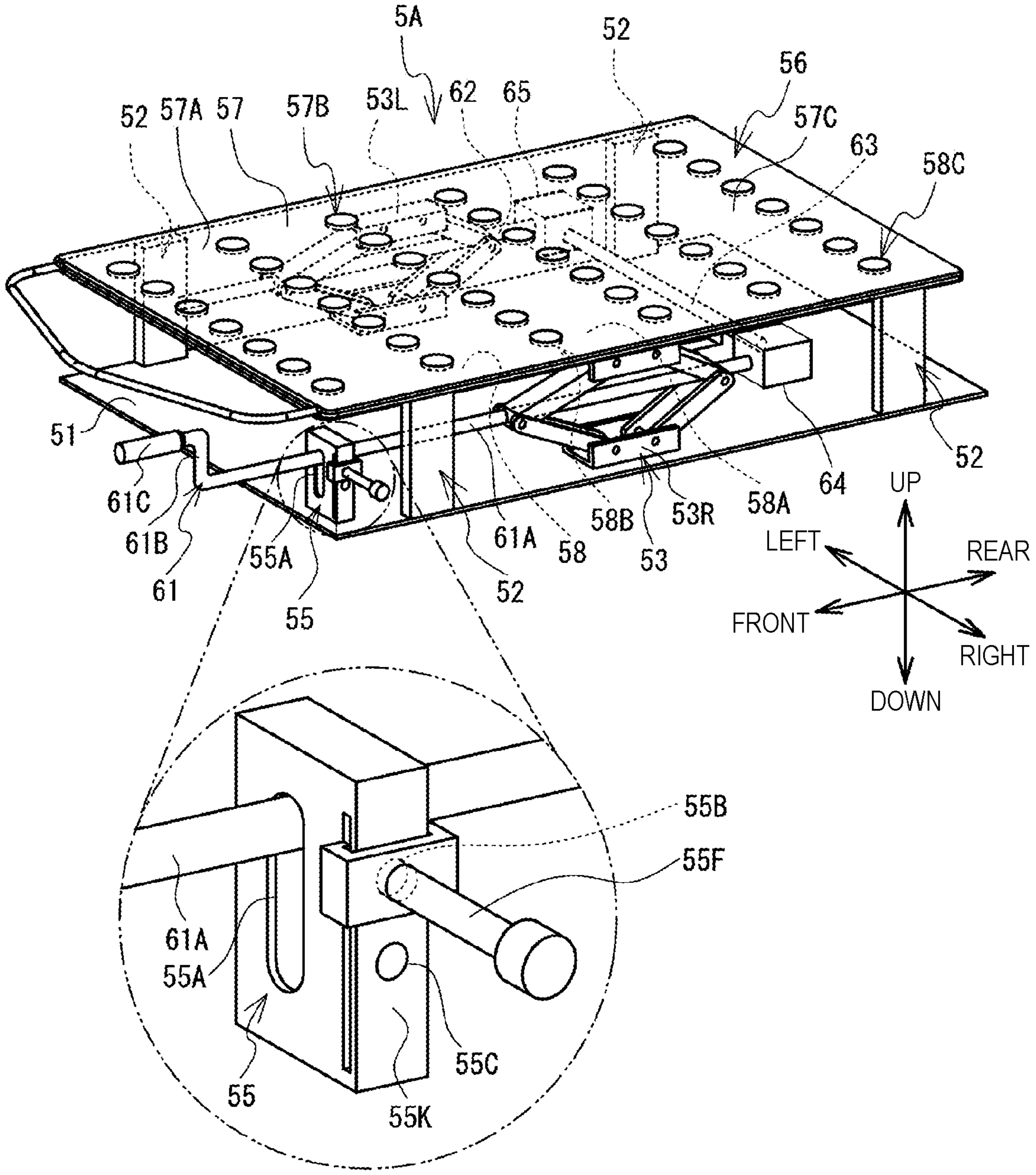
FIG. 3 is a perspective view of a platen 5A in the first state as viewed from the upper front right side.

The detailed structure of the platen 5A will be described with reference to FIGS. 3 to 6B. The platen 5A allows a medium to be placed thereon. As illustrated in FIG. 3, the platen 5A includes a base 51, supports 52, a switching portion 53, a locking mechanism 55, a first member 57, and a second member 58. The base 51 has a flat plate shape extending in the front-rear direction and the left-right direction. The upper surface of the base 51 is provided with the supports 52, elevating mechanisms 53R, 53L, and the locking mechanism 55.

The supports 52 are provided at the right front portion, the left front portion, the right rear portion, and the left rear portion of the upper surface of the base 51. The four supports 52 each have a flat plate shape extending in the upper-lower direction and the front-rear direction. The upper ends of the respective supports 52 are coupled to the first member 57 (see FIG. 4).

Figure 4:
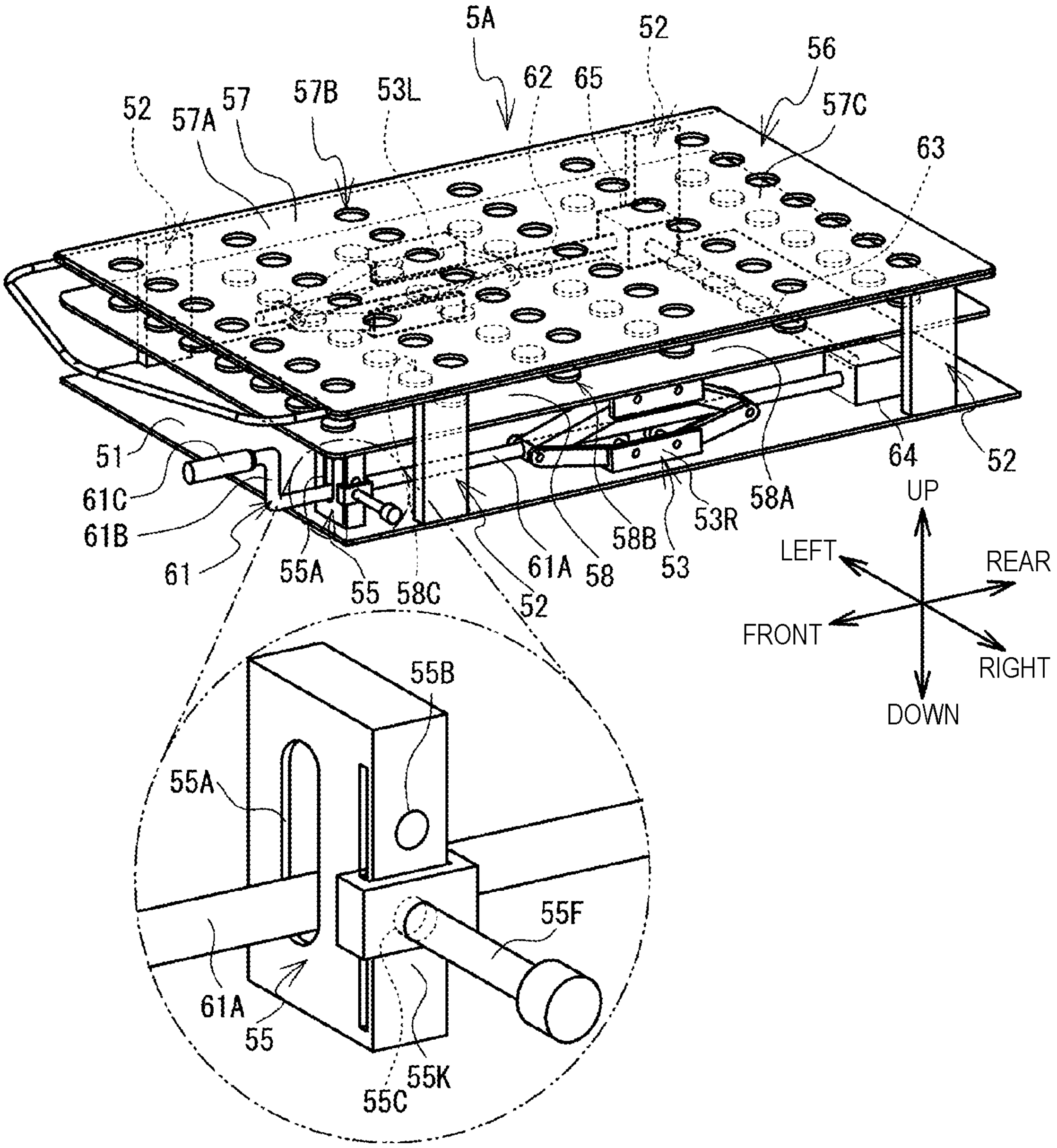
FIG. 4 is a perspective view of the platen 5A in the second state as viewed from the upper front right side.

As illustrated in FIGS. 3 and 4, the switching portion 53 includes the elevating mechanisms 53R, 53L, a handle 61, shafts 62, 63, and coupling boxes 64, 65. The elevating mechanisms 53R, 53L are pantograph jacks. The elevating mechanism 53R is provided on the right portion of the upper surface of the base 51. The elevating mechanism 53L is provided on the left portion of the upper surface of the base 51.

As illustrated in FIG. 5, the elevating mechanism 53R includes a base 71R, lower arms 72R, 73R, upper arms 74R, 75R, and a receiving seat 76R. The base 71R is provided on the upper surface of the base 51. The base 71R extends in the front-rear direction. The base 71R rotatably supports the lower arms 72R, 73R via pins 81R, 82R, respectively. The lower arm 72R extends forward and upward from the front portion of the base 71R. The lower arm 73R extends rearward and upward from the rear portion of the base 71R.

The front end of the lower arm 72R rotatably supports the upper arm 74R via a coupling portion 77R. The front end of the upper arm 74R is supported by the front end of the lower arm 72R, and the upper arm 74R extends rearward and upward from the front end of the lower arm 72R. The rear end of the lower arm 73R rotatably supports the upper arm 75R via a coupling portion 78R. The rear end of the upper arm 75R is supported by the rear end of the lower arm 73R, and the upper arm 75R extends forward and upward from the rear end of the lower arm 73R. The receiving seat 76R is provided above the base 71R. The receiving seat 76R extends in the front-rear direction. The receiving seat 76R rotatably supports the rear end of the upper arm 74R and the front end of the upper arm 75R via pins 83R, 84R, respectively.

The coupling portions 77R, 78R have a shaft 61A inserted through. The shaft 61A extends in the front-rear direction and is rotatable around the axis. The side surface of the shaft 61A is formed with a screw groove. The coupling portion 77R is screwed to the shaft 61A. The coupling portion 78R rotatably supports the shaft 61A. When the shaft 61A rotates in one direction of the directions around the axis, the coupling portions 77R, 78R move toward each other, the rear end of the lower arm 72R rotates clockwise around the coupling portion 77R in a right side view, and the rear end of the upper arm 74R rotates counterclockwise around the coupling portion 77R in a right side view. The front end of the lower arm 73R rotates counterclockwise around the coupling portion 78R in a right side view, and the front end of the upper arm 75R rotates clockwise around the coupling portion 78R in a right side view. Accordingly, the receiving seat 76R is raised with respect to the base 71R (see FIG. 3). When the shaft 61A rotates in the direction opposite to one direction of the directions around the axis, the coupling portions 77R, 78R move away from each other, the rear end of the lower arm 72R rotates counterclockwise about the coupling portion 77R in a right side view, and the rear end of the upper arm 74R rotates clockwise about the coupling portion 77R in a right side view. The front end of the lower arm 73R rotates clockwise around the coupling portion 78R in a right side view, and the front end of the upper arm 75R rotates counterclockwise around the coupling portion 78R in a right side view. Accordingly, the receiving seat 76R is lowered with respect to the base 71R (see FIG. 4).

As illustrated in FIGS. 3 and 4, the elevating mechanism 53R is coupled to the handle 61. The handle 61 includes shafts 61A, 61B, 61C. The shaft 61A is inserted into the locking mechanism 55, the elevating mechanism 53R, and the coupling box 64. The rear end of the shaft 61A is coupled to a bevel gear 61G (see FIG. 5) housed in the coupling box 64. The shaft 61B extends from the front end of the shaft 61A in a direction orthogonal to the front-rear direction. The shaft 61C extends in the front-rear direction and is coupled to the shaft 61A via the shaft 61B.

As illustrated in FIG. 5, the shaft 63 extends in the left-right direction. The right end of the shaft 63 is inserted into the coupling box 64 (see FIG. 3) and coupled to a bevel gear 63A housed in the coupling box 64. The bevel gear 63A meshes with the bevel gear 61G. The left end of the shaft 63 is inserted into the coupling box 65 (see FIG. 3) and coupled to a bevel gear 63B housed in the coupling box 65. The bevel gear 63B meshes with a bevel gear 62G housed in the coupling box 65 described later.

The elevating mechanism 53L has the same structure as the elevating mechanism 53R. As illustrated in FIG. 5, the elevating mechanism 53L includes a base 71L, lower arms 72L, 73L, upper arms 74L, 75L, a receiving seat 76L, coupling portions 77L, 78L, and pins 81L, 82L, 83L, 84L. The base 71L, the lower arms 72L, 73L, the upper arms 74L, 75L, the receiving seat 76L, the coupling portions 77L, 78L, and the pins 81L, 82L, 83L, 84L have the same structure as the base 71R, the lower arms 72R, 73R, the upper arms 74R, 75R, the receiving seat 76R, the coupling portions 77R, 78R, and the pins 81R, 82R, 83R, 84R of the elevating mechanism 53R. The coupling portion 77L is located behind the base 71L. The coupling portion 78L is located in front of the base 71L. The coupling portions 77L, 78L have the shaft 62 inserted through. The shaft 62 extends in the front-rear direction and is rotatable around the axis. The side surface of the shaft 62 is formed with a screw groove. The coupling portion 77L is screwed to the shaft 62. The coupling portion 78L rotatably supports the shaft 62.

The rear end of the shaft 62 is inserted into the coupling box 65 (see FIG. 3) and coupled to the bevel gear 62G housed in the coupling box 65. When the shaft 61A rotates, the shafts 63, 62 also rotate. When the shaft 61A rotates in one direction of the directions around the axis, the coupling portions 77L, 78L move toward each other, and the receiving seat 76L is raised with respect to the base 71L. When the shaft 61A rotates in a direction opposite to the one direction of the directions around the axis, the coupling portions 77L, 78L move away from each other, and the receiving seat 76L is lowered with respect to the base 71L.

The user grips the shaft 61C to rotate the shaft 61A around the axis. Accordingly, the receiving seat 76R of the elevating mechanism 53R and the receiving seat 76L of the elevating mechanism 53L move in the upper-lower direction with respect to the base 51 (see FIGS. 3 and 4). In the present embodiment, the upper ends of the receiving seats 76R, 76L are aligned at the same height and move in the upper-lower direction. When the receiving seat 76R is raised, the shaft 61A inserted through the coupling portions 77R, 78R is raised in conjunction with the receiving seat 76R. When the receiving seat 76R is lowered, the shaft 61A is lowered in conjunction with the receiving seat 76R. When the receiving seats 76R, 76L move up and down, the position in the upper-lower direction of the shaft 61A when moved to the uppermost position is referred to as a first shaft position. The position in the upper-lower direction of the shaft 61A when moved to the lowermost position is referred to as a second shaft position.

As illustrated in FIGS. 3 and 4, the locking mechanism 55 is provided at the right front end of the upper surface of the base 51. The locking mechanism 55 includes a box 55K and a shaft 55F. The box 55K has a quadrangular parallelepiped shape. The front and rear surfaces of the box 55K is provided with a hole 55A. The hole 55A penetrates the box 55K in the front-rear direction. The hole 55A extends in the upper-lower direction. The hole 55A has the shaft 61A inserted through. When the shaft 61A is located at the first shaft position, the shaft 61A is inserted above the center in the upper-lower direction of the hole 55A. When the shaft 61A is located at the second shaft position, the shaft 61A is inserted below the center in the upper-lower direction of the hole 55A.

The right surface of the box 55K is provided with holes 55B, 55C that are screw holes. The position of the upper end of the hole 55B in the upper-lower direction is located above the center in the upper-lower direction of the hole 55A. The position of the lower end of the hole 55C in the upper-lower direction is located below the center in the upper-lower direction of the hole 55A.

The shaft 55F extends in the left-right direction. The left end of the shaft 55F is provided with an elastic member (not illustrated). The side surface of the shaft 55F is formed with a screw groove. The user rotates the shaft 55F with respect to one of the holes 55B, 55C which are screw holes. Accordingly, the shaft 55F is inserted into one of the holes 55B, 55C and moves in the left-right direction. Since the holes 55B, 55C, which are screw holes, and the shaft 55F formed with screw grooves are screwed together, the shaft 55F does not move in the left-right direction when the user does not rotate the shaft 55F. Since the position of the upper end of the hole 55B in the upper-lower direction is located above the center of the hole 55A in the upper-lower direction, when the shaft 55F passes through the hole 55B and moves leftward, the elastic member provided at the left end of the shaft 55F comes into contact with the right end of the shaft 61A located at the first shaft position. Since the position of the lower end of the hole 55C in the upper-lower direction is located below the center of the hole 55A in the upper-lower direction, when the shaft 55F passes through the hole 55C and moves leftward, the elastic member provided at the left end of the shaft 55F comes into contact with the right end of the shaft 61A located at the second shaft position. When the elastic member comes into contact with the right end of the shaft 61A, the user cannot rotate the shaft 61A around the axis due to the frictional force acting between the elastic member and the shaft 61A.

As illustrated in FIGS. 3 and 4, the first member 57 includes a plate 57A and holes 57B. The plate 57A has a flat plate shape extending in the front-rear direction and the left-right direction. The plate 57A is made of metal, for example. The plate 57A is coupled to the upper ends of the four supports 52 and is supported by the four supports 52. The holes 57B are circular holes penetrating in the upper-lower direction. A plurality of holes 57B are provided in the plate 57A. The holes 57B are arranged in the entire plate 57A at intervals in the main scanning direction and the sub-scanning direction.

As illustrated in FIGS. 3 and 4, the second member 58 includes a plate 58A and cylindrical columns 58B. The plate 58A has a flat plate shape extending in the front-rear direction and the left-right direction. The plate 58A is made of metal, for example. The plate 58A is located below the plate 57A. The plate 58A is located inside the plurality of supports 52 in the left-right direction. The plate 58A is coupled to the upper end of the receiving seat 76R of the elevating mechanism 53R and the upper end of the receiving seat 76L of the elevating mechanism 53L, and is supported by the elevating mechanisms 53R, 53L. The plate 58A moves in the upper-lower direction with respect to the plate 57A as the receiving seats 76R, 76L move in the upper-lower direction. The plate 58A is located inside the plurality of supports 52 in the left-right direction and does not interfere with the plurality of supports 52.

A plurality of the cylindrical columns 58B are provided on the upper surface of the plate 58A. The axial direction of the cylindrical columns 58B coincides with the upper-lower direction. The length in the upper-lower direction of the cylindrical columns 58B is equal to the length in the upper-lower direction of the plate 57A (the thickness of the plate 57A). Upper surfaces 58C of the cylindrical columns 58B are circular and have the same shape as the holes 57B. The plurality of cylindrical columns 58B are respectively provided at the same positions as the holes 57B in plan view. The upper surfaces 58C are arranged on the entire plate 58A at intervals in the main scanning direction and the sub-scanning direction.

As illustrated in FIG. 3, when the shaft 61A is located at the first shaft position, the plate 58A is located at the upper end of the movement range. The plurality of cylindrical columns 58B of the second member 58 are respectively inserted into the holes 57B of the first member 57. The positions in the upper-lower direction of the upper surface 57C of the plate 57A and the upper surfaces 58C of the plurality of cylindrical columns 58B coincide with each other. For this reason, as illustrated in FIG. 6A, in the platen 5A, the upper surface 57C of the first member 57 and the plurality of upper surfaces 58C of the second member 58 integrally form a contact surface 56. The contact surface 56 is formed inside an outer edge R of the plate 57A in the front-rear direction and the left-right direction, and allows the medium to be placed thereon. In other words, the contact surface 56 is a medium placement surface. In FIGS. 6A and 6B, the contact surface 56 is indicated by diagonal lines. Hereinafter, a state of the platen 5A in which the upper surface 57C and the plurality of upper surfaces 58C are arranged in the same plane and the contact surface 56 is formed by the upper surface 57C and the plurality of upper surfaces 58C inside the outer edge R of the plate 57A is referred to as a first state. The size (area) of the contact surface 56 in the first state is referred to as a first area.

As illustrated in FIG. 4, when the shaft 61A is located at the second shaft position, the plate 58A is located at the lower end of the movement range. At this time, the upper surface 58C of each of the plurality of cylindrical columns 58B is located below the plate 57A in the upper-lower direction. Therefore, as illustrated in FIG. 6B, the upper surface 57C forms the contact surface 56, and the plurality of upper surfaces 58C (see FIG. 6A) do not form the contact surface 56. Hereinafter, a state of the platen 5A in which the upper surface 57C and the plurality of upper surfaces 58C are not arranged in the same plane, the upper surface 57C forms the contact surface 56 inside the outer edge R of the plate 57A, and the plurality of upper surfaces 58C do not form the contact surface 56 is referred to as a second state. In the second state, the platen 5A supports the medium on the upper surface 57C as the contact surface 56. On the other hand, in the second state, the plurality of upper surfaces 58C located below the plate 57A do not support the medium. The size (area) of the contact surface 56 in the second state is referred to as a second area. As illustrated in FIG. 6A, the second area is smaller than the first area by the area of the plurality of upper surfaces 58C.

In the platen 5A, the central portion in the upper surface 57C of the plate 57A is referred to as a central portion A. For example, as illustrated in FIG. 6A, the central portion A is a portion inside a virtual frame S that is separated by ⅔ L from the center of the upper surface 57C, where L is the distance from the center of the upper surface 57C to the left end of the plate 57A. Within the medium placed on the platen 5A, the ink is more likely to be ejected in the portion placed in the central portion A than the portion placed outside the central portion A.

The contact surface 56 of the platen 5A in the first state includes the upper surface 57C of the plate 57A and the plurality of upper surfaces 58C. The contact surface 56 of the platen 5A in the second state includes the upper surface 57C of the plate 57A, but does not include the plurality of upper surfaces 58C inside the outer edge R of the plate 57A. As illustrated in FIG. 6A, the contact surface 56 at the central portion A of the platen 5A in the first state includes the portion inside the virtual frame S in the upper surface 57C of the plate 57A and the portion inside the virtual frame S among the plurality of upper surfaces 58C. As illustrated in FIG. 6B, the contact surface 56 at the central portion A of the platen 5A in the second state includes the portion inside the virtual frame S in the upper surface 57C of the plate 57A, but does not include the portion inside the virtual frame S among the plurality of upper surfaces 58C. In both the first state and the second state, the contact surface 56 in the central portion A of the platen 5A corresponds to the portion where the ink is more likely to be ejected. In the central portion A, the size (area) of the contact surface 56 in the second state is smaller than the size of the contact surface 56 in the first state.

The outline of printing in the printer 1 will be described with reference to FIGS. 1, 3, and 4. The medium is coated with a pretreatment agent in advance and is wetted. The pretreatment agent is a base coating agent applied before the ink is applied to the medium. The pretreatment agent contains, for example, a divalent metal salt (for example, $CaCl_2$ or $Ca(NO_3)_2$) to make the color of the ink vivid.

The user operates the input unit 46 to move the platen 5A forward to the position illustrated in FIG. 1. The user rotates the shaft 61A. Accordingly, the switching portion 53 raises the receiving seat 76R of the elevating mechanism 53R and the receiving seat 76L of the elevating mechanism 53L, and raises the second member 58 relative to the first member 57.

The upper surface 57C of the first member 57 and the plurality of upper surfaces 58C of the second member 58 are arranged in the same plane. Thus, the switching portion 53 switches the platen 5A to the first state.

The user inserts the shaft 55F into the hole 55B and rotates the shaft 55F relative to the hole 55B. Accordingly, the user moves the shaft 55F leftward. The elastic member provided at the left end of the shaft 55F comes into contact with the shaft 61A located at the first shaft position, and the shaft 61A cannot rotate around the axis due to the frictional force acting between the elastic member and the shaft 61A. Accordingly, the locking mechanism 55 locks the platen 5A in the first state (see FIG. 3). The user places the medium on the contact surface 56 of the platen 5A in the first state. The user operates the input unit 46 to move the platen 5A rearward from the position illustrated in FIG. 1 to a position facing the heads 100, 200.

The printer 1 ejects the white ink from the head 100 and ejects the color ink from the head 200 while scanning the carriage 20 in the left-right direction. When the ejection of the ink by one scan is completed, the printer 1 moves the platen 5A forward, and ejects the ink from the heads 100, 200 while scanning the carriage 20 in the left-right direction again. The color ink is ejected above the white ink. That is, the white ink is used as the base of the color ink.

When the printing on the medium is completed, the platen 5A moves the printer 1 to the position illustrated in FIG. 1. The user rotates the shaft 55F relative to the hole 55B. Accordingly, the user moves the shaft 55F rightward. The elastic member provided at the left end of the shaft 55F is separated from the shaft 61A located at the first shaft position, and the shaft 61A becomes rotatable around the axis. Thus, the locking mechanism 55 releases the lock of the platen 5A in the first state. The user rotates the shaft 61A. Accordingly, the switching portion 53 lowers the receiving seat 76R of the elevating mechanism 53R and the receiving seat 76L of the elevating mechanism 53L, and lowers the second member 58 relative to the first member 57. The upper surface 58C of each of the plurality of cylindrical columns 58B is located below the plate 57A in the upper-lower direction. Thus, the switching portion 53 switches the platen 5A to the second state.

The user inserts the shaft 55F into the hole 55C and rotates the shaft 55F relative to the hole 55C. Accordingly, the user moves the shaft 55F leftward. The elastic member provided at the left end of the shaft 55F abuts on the shaft 61A located at the second shaft position, and the shaft 61A cannot rotate around the axis by the frictional force acting between the elastic member and the shaft 61A. Accordingly, the locking mechanism 55 locks the platen 5A in the second state (see FIG. 4). The user removes the medium wetted with the pretreatment agent and the ink from the contact surface 56 of the platen 5A in the second state.

As described above, the platen 5A includes the first member 57 and the second member 58. The first member 57 includes the plate 57A and the holes 57B. The second member 58 includes the plate 58A and the cylindrical columns 58B. The platen 5A can be switched between the first state and the second state. The first state is a state in which the contact surface 56 is formed by the upper surface 57C and the plurality of upper surfaces 58C inside the outer edge R of the plate 57A. The second state is a state in which the upper surface 57C forms the contact surface 56 inside the outer edge R of the plate 57A and the plurality of upper surfaces 58C do not form the contact surface 56. The platen 5A switches from the first state to the second state so that the size of the contact surface 56 decreases from the first area to the second area. By switching the state from the first state to the second state, the platen 5A can prevent the difficulty in removing the wet medium.

The platen 5A includes a switching portion 53. When the user rotates the shaft 61A around the axis, the switching portion 53 moves the receiving seat 76R of the elevating mechanism 53R and the receiving seat 76L of the elevating mechanism 53L in the upper-lower direction, and moves the second member 58 in the upper-lower direction relative to the first member 57. In this manner, the switching portion 53 can switch the state of the platen 5A by the user rotating the shaft 61A around the axis.

In the upper surface 57C of the plate 57A, the central portion A in the first state includes the portion of the upper surface 57C inside the virtual frame S and the portion inside the virtual frame S among the plurality of upper surfaces 58C. On the other hand, the central portion A in the second state includes a portion of the upper surface 57C inside the virtual frame S, but does not include the portion inside the virtual frame S among the plurality of upper surfaces 58C. Therefore, in the central portion A, the size of the contact surface 56 in the second state is smaller than the size of the contact surface 56 in the first state. A part of the medium is placed in the central portion A of the platen 5A. In this portion, the ink is more likely to be ejected than the portion of the medium placed in the portion other than the central portion A. Accordingly, the platen 5A in the second state can prevent the difficulty in removing the medium placed on the central portion A of the plate 57A.

A plurality of the cylindrical columns 58B are provided on the plate 58A. The upper surfaces 58C are arranged at intervals in the main scanning direction and the sub-scanning direction. The plurality of holes 57B of the first member 57 are respectively provided at the same positions as the cylindrical columns 58B in plan view. Therefore, the holes 57B are also arranged at intervals in the main scanning direction and the sub-scanning direction. Accordingly, the platen 5A can stably support the placed medium even in the second state in which the size of the contact surface 56 is smaller than that in the first state.

Each of the upper surfaces 58C is circular. In this case, the second member 58 can be formed more easily than in a case where each of the upper surfaces 58C is elliptical or polygonal other than quadrangular.

The platen 5A includes a locking mechanism 55 for locking the state to the first state or the second state. By the locking mechanism 55 locking the state of the platen 5A to the first state and preventing from switching to the second state, the platen 5A can stably support the medium placed upon the printing by the printer 1. By the locking mechanism 55 locking the state of the platen 5A to the second state and preventing from switching to the first state, the user can remove the medium placed on the platen 5A in the second state. Therefore, the platen 5A can prevent the difficulty in removing the wet medium.

The contact surface 56 in the first state is configured such that the upper surface 57C and the plurality of upper surfaces 58C are arranged in the same plane. In this case, the platen 5A can stably support the medium in the first state.

The printer 1 includes the platen 5A and the heads 100, 200 for ejecting the ink onto the medium placed on the contact surface 56 of the platen 5A in the first state. The printer 1 can prevent the difficulty in removing the medium wetted due to the printing by the platen 5A.

The medium after printing is placed on the contact surface 56 while being wetted with the pretreatment agent and the ink. By switching the state from the first state to the second state, the platen 5A can prevent the difficulty in removing the wet medium.

In the above-described embodiment, the upper surface 57C corresponds to a "first surface" of the present disclosure. The plurality of upper surfaces 58C correspond to a "second surface" of the present disclosure. The plate 57A corresponds to a "plate" of the present disclosure. The upper surface 58C corresponds to a "partial surface" of the present disclosure. The head 100 and the head 200 correspond to an "ink ejection unit" of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The present disclosure can be variously modified from the above-described embodiment. The various modifications described below can be combined as long as no contradiction occurs. For example, the present disclosure is also applicable to a printer for performing printing by a printing method different from the ink jet type. In addition, the platen 5A may be detachably attached to the printer 1 and replaced with respect to the printer 1.

In the above embodiment, the switching portion 53 switches the state of the platen 5A, but the mode of the switching portion 53 is not limited to the above embodiment. For example, the switching portion 53 may include an air cylinder that extends and contracts in the upper-lower direction instead of the elevating mechanisms 53R, 53L, and may extend and contract the air cylinder according to the input from the input unit 46. In this case, when the user operates the input unit 46, the switching portion 53 extends and contracts the air cylinder to move the second member 58 in the upper-lower direction relative to the first member 57, thereby switching the state of the platen 5A. In this way, the switching portion 53 can switch the state of the platen 5A by a drive source other than human power. Alternatively, the platen 5A may switch the state by the user directly moving the second member 58 by hand, without the switching portion 53.

A platen 5B will be described with reference to FIGS. 7 and 8. The platen 5B switches the state by the user directly moving the second member 58 by hand, without the switching portion 53. In the following description, the components having the same functions as those of the platen 5A of the above-described embodiment are denoted by the same reference signs as those of the platen 5A, and the description thereof will be omitted or simplified.

The platen 5B includes the base 51, the four supports 52, the first member 57, the second member 58, and fasteners 60R, 60L. The shape of the fastener 60R when viewed from the front is a substantially U-shape opening leftward. The shape of the fastener 60L when viewed from the front is a substantially U-shape opening rightward. That is, the fasteners 60R, 60L can sandwich the first member 57 and the second member 58 while being in contact with each other in the upper-lower direction.

As illustrated in FIG. 7, in the platen 5B in the first state, the first member 57 and the second member 58 are held by the fasteners 60R, 60L. The user removes the fasteners 60R, 60L from the first member 57 and the second member 58. Next, the user directly holds the second member 58 by hand and moves the second member 58 downward relative to the first member 57. Accordingly, as illustrated in FIG. 8, the platen 5B is switched to the second state.

On the other hand, the user directly holds the second member 58 of the platen 5B in the second state by hand, moves the second member 58 upward relative to the first member 57, and brings the first member 57 and the second member 58 into contact with each other. Accordingly, as illustrated in FIG. 7, the platen 5B is switched to the first state. Next, the user fits the fasteners 60R, 60L into the first member 57 and the second member 58. The fasteners 60R, 60L hold the first member 57 and the second member 58. The platen 5B is locked in the first state by holding the first member 57 and the second member 58 with the fasteners 60R, 60L. The fasteners 60R, 60L correspond to a "locking mechanism" of the present disclosure.

In the embodiment described above, the platen 5A, 5B switches from the first state to the second state by the second member 58 moving downward relative to the first member 57, but is not limited thereto. For example, the platen 5A, 5B may switch from the first state to the second state by moving the second member 58 upward with respect to the first member 57. In this case, the upper surfaces 58C of the plate 58A and the lower surface of the plate 57A are separated from each other in the platen 5A, 5B in the first state. When switching from the first state to the second state, the second member 58 moves upward relative to the first member 57, the plurality of upper surfaces 58C form the contact surface 56 in the platen 5A, 5B in the second state, and the upper surface 57C does not form the contact surface 56. The medium may be supported by the contact surface 56. The second member 58 corresponds to the "first member" of the present disclosure. The first member 57 corresponds to the "second member" of the present disclosure. The upper surfaces 58C correspond to the "first surface" of the present disclosure. The upper surface 57C corresponds to the "second surface" of the present disclosure.

In the embodiment described above, the platen 5A, 5B switches the state by the second member 58 moving in the upper-lower direction relative to the first member 57, but is not limited thereto. For example, the state of the platen 5A, 5B may be switched by moving the first member 57 in the upper-lower direction relative to the second member 58, or may be switched by moving the first member 57 and the second member 58 in the upper-lower direction. The platen 5A, 5B is only required that the direction in which the second member 58 moves relative to the first member 57 when switching the state includes the upper-lower direction. For example, the platen 5A, 5B may be switched from the first state to the second state by moving the second member 58 rightward and downward relative to the first member 57.

In the above-described embodiment, the holes 57B are arranged in the entire plate 57A at intervals in the main scanning direction and the sub-scanning direction, but are not limited thereto. The plurality of holes 57B may be arranged in one of the main scanning direction or the sub-scanning direction.

The plate 57A may be provided with a plurality of holes having different sizes. The plurality of cylindrical columns

58B may be arranged in a radial shape from the center of the plate 58A, or may be provided in the central portion of the plate 58A. The plate 58A may be provided with a plurality of cylindrical columns having different sizes.

In the above embodiment, the correlation between the second area and the first area is not particularly limited, but it is desirable that the second area is half or less of the first area. In this case, the size of the contact surface 56 in the second state is smaller than the size of the contact surface 56 in the first state. As a result, the platen 5A, 5B in the second state can prevent the difficulty in removing the wet medium more than the platen 5A, 5B in the first state.

In the above embodiment, the plate 57A is provided with the plurality of holes 57B, and the plate 58A may be provided with the corresponding cylindrical columns 58B. In contrast, the plate 57A may be provided with only one hole 57B, and the plate 58A may be provided with only one corresponding cylindrical column 58B.

In the above embodiment, the holes 57B are circular holes, and the cylindrical columns 58B have a cylindrical shape. The holes 57B may be quadrangular in plan view, or the plate 58A may be provided with quadrangular columns instead of the cylindrical columns 58B. If the plate 58A is provided with quadrangular columns, the upper surface 58C has a quadrangular shape. Further, all the holes may be circular holes and all the columns may be cylindrical columns, all the holes may be quadrangular holes and all the columns may be quadrangular columns, or the holes may include circular holes and quadrangular holes and the columns may include circular columns corresponding to the circular holes and quadrangular columns corresponding to the quadrangular holes. In this case as well, the second member 58 can be formed more easily than in a case where the upper surfaces 58C are elliptical or polygonal other than quadrangular.

The platen 5A, 5B may not include the locking mechanism 55. In the above-described embodiment, the locking mechanism 55 locks the platen 5A in both the first state and the second state. In contrast, the locking mechanism 55 may lock the platen 5A in only one of the first state or the second state. In addition, in the above-described embodiment, the locking mechanism 55 locks the platen 5A in both the first state and the second state by the frictional force acting between the elastic member provided at the left end of the shaft 55F and the right end of the shaft 61A. In contrast, the locking mechanism 55 may lock the platen pin 5A in the first state by the upper end of the shaft 55F inserted into the box 55K coming into contact with the lower end of the shaft 61A positioned at the first shaft position in the platen pin 5A in the first state, so that the shaft 61A cannot move downward from the first shaft position. In addition, the locking mechanism 55 may lock the platen pin 5A in the second state by the lower end of the shaft 55F inserted into the box 55K coming into contact with the upper end of the shaft 61A positioned at the second shaft position in the platen pin 5A in the second state, so that the shaft 61A cannot move upward from the second shaft position.

In the above embodiment, the medium is applied with the pretreatment agent in advance before the printing, but the medium may be not applied with the pretreatment agent. Alternatively, the medium may be applied with the pretreatment agent and then dried, followed by ejecting the ink. In this case as well, the platen 5A, 5B can prevent the difficulty in removing the medium wetted with the ink.

For example, in the platen 5A, 5B, the plurality of holes 57B may be formed only in the central portion A, and the plurality of holes 57B may not be provided in the region other than the central portion A.

For example, the printer 1 may be configured to move the platen 5A or 5B in the main scanning direction without moving the heads 100, 200. That is, the printer 1 may be configured to relatively move the heads 100, 200 and the platen 5A, 5B.

The carriage 20 is only required to be mounted with at least one of the heads 100, 200. For example, the carriage 20 may be only mounted with only the head 200. The ink ejected by the heads 100, 200 may be changed as appropriate.

What is claimed is:

1. A platen configured to be mounted on a printer configured to eject ink onto a medium, the platen being configured to define a contact surface which is a medium placement surface when the platen is mounted on the printer, the platen comprising:

a first member having a first surface; and a second member having a second surface, wherein the first member comprises a plate having the first surface, wherein a state of the platen is switchable between:

a first state in which the contact surface is formed by the first surface and the second surface such that a size of the contact surface is a first area; and a second state in which the contact surface is formed by the first surface such that a size of the contact surface is a second area smaller than the first area, wherein in the first state, the first surface and the second surface form the contact surface inside an outer edge of the plate in a direction in which the first surface extends, wherein in the second state, the first surface forms the contact surface inside the outer edge of the plate and the second surface does not form the contact surface, and wherein the state of the platen is in the first state when the ink is ejected onto the medium, and the state of the platen is switched from the first state to the second state after the ink ejected onto the medium.

2. The platen according to claim 1, further comprising:

a switching portion configured to switch the state of the platen between the first state and the second state by moving the second member relative to the first member.

3. The platen according to claim 1, wherein in a central portion of the plate, the size of the contact surface in the second state is smaller than the size of the contact surface in the first state.

4. The platen according to claim 1, wherein the second area is half or less of the first area.

5. The platen according to claim 1, wherein the second surface comprises a plurality of partial surfaces, and wherein the plurality of partial surfaces are arranged on the second member at intervals in directions corresponding to a main scanning direction and a sub-scanning direction of the printer when the platen is mounted on the printer.

6. The platen according to claim 5, wherein the plurality of partial surfaces comprise at least one of a first partial surface having a circular shape or a second partial surface having a quadrangular shape.

7. The platen according to claim 1, a locking mechanism configured to lock the state of the platen to one of the first state or the second state.

8. The platen according to claim 1, wherein the contact surface in the first state has a smooth surface by the first surface and the second surface.

9. A printer comprising:

the platen according to claim 1; and an ink ejection unit configured to eject the ink onto the medium placed on the contact surface of the platen in the first state.

10. The printer according to claim 9, wherein the ink ejection unit ejects the ink in a state where the medium is wetted with a pretreatment agent.

* * * * *